United States Patent [19]
Reitz et al.

[11] Patent Number: 5,232,639
[45] Date of Patent: Aug. 3, 1993

[54] PROCESS FOR FORMING ARTICLES WITH ANISOTROPIC PROPERTIES

[75] Inventors: Ronald P. Reitz, Hyattsville; Armando L. Santiago, Annapolis, both of Md.

[73] Assignee: The United States of America as represented by the Secretary of the Navy, Washington, D.C.

[21] Appl. No.: 610,651

[22] Filed: Nov. 8, 1990

Related U.S. Application Data

[63] Continuation-in-part of Ser. No. 584,836, Sep. 19, 1990, abandoned.

[51] Int. Cl.$^5$ .............. B29C 67/00; B29C 35/02; H01B 1/20
[52] U.S. Cl. .................. 264/22; 264/24; 264/26; 264/27; 252/500; 252/512; 252/518
[58] Field of Search ............ 252/511, 512, 518, 74, 252/73, 77, 78.1, 78.3, 79, 500; 204/3, 130, 164; 264/24, 26, 22, 27; 219/10.53, 10.81, 10.41

[56] References Cited

U.S. PATENT DOCUMENTS

| | | | |
|---|---|---|---|
| 3,937,774 | 2/1976 | Wiley et al. | 264/26 |
| 4,301,187 | 11/1981 | Burch | 427/45.1 |
| 4,407,054 | 10/1983 | Zipfel, Jr. | 252/62.9 |
| 4,423,191 | 12/1983 | Haven et al. | 264/26 |
| 4,707,231 | 1/1987 | Berger | 204/164 |
| 4,769,167 | 9/1988 | Haas et al. | 252/76 |
| 4,826,616 | 5/1989 | Tanino et al. | 252/62.9 |
| 4,851,167 | 7/1989 | Marc | 264/26 |
| 4,900,387 | 2/1990 | Johnson | 156/272.2 |
| 4,921,928 | 5/1990 | Tanino et al. | 252/62.9 |
| 4,990,279 | 2/1991 | Ahmed | 252/73 |
| 4,992,192 | 2/1991 | Ahmed | 252/73 |

*Primary Examiner*—Paul Lieberman
*Assistant Examiner*—Bradley A. Swope
*Attorney, Agent, or Firm*—Charles D. Miller; Howard Kaiser

[57] ABSTRACT

A process for subjecting an electroset material to an evacuated environment prior to electrosetting results in a material with anisotropic density programmability. Articles can be fabricated with an anisotropic void distribution therein.

9 Claims, No Drawings

PROCESS FOR FORMING ARTICLES WITH ANISOTROPIC PROPERTIES

STATEMENT OF GOVERNMENT INTEREST

The instant invention described herein may be used by or for the Government of the United States of America without payment on any royalties thereon or therefor.

CROSS REFERENCE TO RELATED APPLICATIONS

This application is a continuation in part of a patent application Ser. No. 07/584,836 entitled PROGRAMMABLE ELECTROSET MATERIALS AND PROCESS, filed Sep. 19, 1990 now abandoned.

FIELD OF THE INVENTION

This invention relates to the field of flexible, intelligent processing of materials wherein said materials are fabricated from fluids which change from a liquid to a solid during a curing phase, said curing phase being affected at least in part by the application of electric fields to said fluids.

BACKGROUND OF THE INVENTION

It has been established that the material properties of an object formed by castable electroset compositions can be controllably altered by applying an electric field to said composition during the curing of said composition. Such art is well established in co-pending patent application Ser. No. 07/405,178 filed Sep. 11, 1989 now U.S. Pat. No. 5,194,181 and in an application entitled PROGRAMMABLE ELECTROSET MATERIALS AND PROCESSES, filed Sep. 19, 1990 Ser. No. 07/584,836 now abandoned both of which are incorporated herein by reference. It is taught in the co-pending applications that materials called electroset materials can be accelerated in their cure and modified in their properties by application of an electric field during the curing phase.

Electroviscous fluids refer to fluids which exhibit the property of increased viscosity when the fluid is subjected to an electric field. One phenomenon for electrically controlling the viscosity of a fluid is commonly known as the Winslow effect. The term Winslow effect referes to the phenomenon of electrically controlling the viscosity of a fluid comprising a suspension of finely divided electrically polarizable matter in a dielectric fluid by subjecting the fluid to an electric field. Within this disclosure and the appended claims, the finely divided electrically polarizable matter is referred to as aggregate.

Numerous types of electroviscous fluids and aggregates are disclosed in my copending applications referenced above as well as in the prior art. Electroviscous fluids and aggregates for electroviscous fluids are disclosed in the prior art in U.S. Pat. Nos. 4,687,589; 3,427,247; 3,970,573; 3,984,339; 4,502,973; 4,737,886, the disclosures of which are hereby incorporated by reference.

It is known that molded articles can be made by pouring a phase changing vehicle into a form, allowing the vehicle to set or cure and then removing the molded article from the mold. As used herein the term phase changing vehicle applies to any composition which changes state from a flowable to a less flowable or solid state when such compositions cure or set in the normal course of their use. Numerous commercially available compositions are available which exhibit such phase changing characteristics, examples of which are hereinafter disclosed. These include vehicles made from mixing multipart constituents which chemically react and vehicles having a contituent or a composition of constituents which reacts with its surroundings such as for example air.

It has been found that aggregates as are suitable for use as aggregates in electroviscous fluids may be advantageously put to other purposes. When a suitable electroviscous fluid aggregate is added to a phase changing vehicle, an electroviscous fluid is formed whereby the fluid is susceptible of being held in place by the Winslow effect during the time of phase change of the composition. Suprisingly, it has been found that a composition comprising electroviscous fluid aggregate in a phase changing vehicle will, when the composition is subjected to an electric field, set or cure much more rapidly than the same composition sets or cures when not under the influence of an electric field. The phenomonenon of accelerated curing of such a composition is referred to as the second Reitz effect.

Within this disclosure and the appended claims, the term electroset composition is used to relate to a composition which is susceptible to being shaped or cured by influence of an applied electric field.

An electroset composition comprises a phase changing vehicle and an electrically polarizable aggregate. The term aggregate is used in the collective to include a multiplicity of polarizable particles. The composition is responsive to an applied electric field in that the field cooperates to hold the material in place while the material cures and to drastically accelerate the cure of the material.

One aggregate as disclosed in my copending application Ser. No. 07/219,522 was tested and found to be useful for the purposes of the present invention. Thereafter, it was found that aggregates other than those of my copending application were also useful in forming electroset compositions in accordance with the present invention. Consequently it is expected that any of the aggregates disclosed in my copending application as well as any of the aggregates disclosed in the prior art as generally useful for making electroviscous fluids are also generally useful as aggregates for forming electroset compositions. Aggregates suitable for use in an electroset composition include those suitable for use as aggregates for electroviscous fluids.

While it is known that many materials may be initially fluid enough to be injected into a mold and permitted to harden into solids, many of these materials have slow cure times, that is, they do not harden rapidly into an identifiable and transportable form. On the other hand, an electroset composition can be cast into a mold and held in place and cured by the application of an electric field.

Another advantage is that the materials of the invention may have their cure rate electrically determined, accelerating the cure with a high potential, low energy consumption electric field as opposed to accelerating the cure by conventional means such as heating the material and its surrounding area or adding additional catalyst. The accelerated cure overcomes another objections to curing material in the conventional way. For example, some moldable materials give off an offensive odor as they cure. Such a material is RTV silicone rubber which gives off a pungent acetic acid odor as it sets and cures. Accelerating the cure reduces the time that these odors will be offensive to persons in the surrounding area.

Yet another advantage is that with electric field curing, the cure rate tends to be constant through the thickness of a shape. Most phase changing vehicles tend to cure more rapidly on the surface than regions in the interior of the shape. electroviscous aggregate has been used to describe an aggregate which, when placed in a dielectric liquid, causes the combination of fluid and aggregate to behave electroviscously. In the present application, the term electrorheological aggregate is used in similar manner.

Electroset materials, in accordance with the present invention, comprise, castable fluid compounds such as, for example, fluid polymers and ceramics that can be caused to set and cure electrically or wherein the set and cure rate is electrically controllable. The present invention comprises electroset material that have electrically controllable end product properties.

At the time of filing the copending application Ser. No. 07/405,178, now U.S. Pat. No. 5,194,181, it was believed that the sole effect of applying an electric field to the electroset compound was to accelerate the cure of a compound that would otherwise cure in its normal mode of application without benefit of any specific acceleration mechanism.

It has since been determined that the physical characteristics such as for example density and specific gravity of certain electroset compounds are susceptible to influence by an applied electric field during the cure time of the material. Two part epoxy type compounds which cure by exothermic reaction are especially useful as the phase changing vehicle. Further, it has been determined that the density of the cured material may either be isotropic or anisotropic. Isotropic density means that the incremental density of the cured material remains about the same through out the volume of the cured material. Anisotropic density means that the incremental density of the cured material has readily observable different values at different parts of the volume of the cured material.

Herein the term electroshaped materials shall refer to the materials comprising any object deriving its shape, at least in part, from the application of an electric field to those materials. Thus, while it is cooling and undergoing a phase change from fluid to solid, a thermoplastic material or other phase changing vehicle with electrorheological aggregate dispersed therein can derive its shape by means of its immersion in an electric field.

Materials made in accordance with the present invention have controllably different physical end product properties. In this disclosure the term "end product properties" refers to those properties of the material after the material has fully cured. The end product properties of the present invention can be made relatively homogenous throughout the electroset material, or alternatively, anisotropic.

The present invention is useful and advantageous in the fabrication of polymeric articles. One such article that may be advantageously manufactured using the compositions and processes of the present invention is shoe soles and portions of shoe soles. In accordance with the present invention, shoe soles are fabricated with a great variety of chosen compressibilities. Applying an electric field to properly formulated electroset material shaped in the form of a shoe sole while the electroset material is undergoing phase change from fluid to solid, will not only accelerate the cure of the sole but will alter the overall compressibility of the resultant sole. Changing the applied electric field alters the obtained compressibility of the sole. Also by selective application of field strength to various parts of the sole, the compressibility of some portions of the sole are made selectively different from other parts of the sole.

The present invention provides an advantageous means of altering the properties of a fabricated shoe sole not found in the prior art. In prior art manufacturing of castable polymer shoe soles required that the formulation of the castable polymer be changed in order to significantly change the shoe sole compressibility. Such a change in formulation requires the time consuming and messy job of recalculating the proportions of polymer constituents to be mixed, measuring out these new proportions of polymer constituent materials and then mixing. Often, the newly reformulated polymer is incompatible with the constituents of the prior polymer. This necessitates care to ensure that the prior polymer constituents and those of the new polymer are not accidently mixed together.

The materials of the present invention, on the other hand, do not need to be reformulated in order to yield changes in the desired properties of the shoe soles.

Several electroset materials were fabricated and tested to determine their end-product physical properties. During the process of electrosetting the materials, a Glassman 30 kilovolt (kv), 50 milliamp (ma) high voltage power supply, Model PS/PH030P050, serial 149470 Master/slave/AHV was used to energize the electroset material fluid. This power supply has the convenient features of both a tunable current limiter dial, which limits the maximum allowable output current and a tunable voltage limiter dial, which limits the maximum allowable output voltage. Each dial also has an adjacent corresponding milliamp meter and kilovolt meter, respectively. Hereinafter, unless otherwise specified, this supply was used in all tests of sample materials in accordance with the various examples.

It is not yet apparent which, if any, of the above postulated theories may be correct in explaining the presence of increased heating in the curing material or voids in the cured material. The phenomenon may be better explainable by some yet to be postulated theory. What is known is that the electrosetting with included voids occurs as a function of electrical current flow through the curing material and the passage of current causes the release of a gas or vapor useful as a blowing agent to cause the voids.

Regardless of the reason the foaming or bubbling occurred, it was observed. The amount of observed foaming and the amount of voids later found in the samples was indeed electrically controlled. Thus, example 1 provides an example of a material with electrically activated and electrically controlled foaming in an electroset material. The effect of accelerating the cure of a material by means of applying and electric field thereto is known as the second Reitz effect. There are, however, limitations to the programmability of the electroset compositions made in accordance with the co-pending applications. For instance, it is known that the density programming of some electroset materials is accomplished through electrical foaming of the material while the material is curing. Depending upon its composition, the electroset material may have a homogeneous density throughout or, alternatively, it may have an anisotropic density distribution throughout. The anisotropy is dependent upon the formulation of the electroset material. While it is known that the amount of adhesion of an electroset composition to an electrode can be selectively controlled electrically to be specifically homogeneous or, alternatively, specifically anisotropic, changing the density anisotropy or density homogeneity of the end-product usually requires that the formulation of the electroset composition be changed. This requires that a new formulation be mixed and limits the usefulness of each formulation. Furthermore, reformulating an electroset material and mixing a new electroset composition costs money and takes time to implement. It is, therefore, advantageous to control the homogeneity or anisotropy of the density of an electroset material that does not require mixing differing formulations of electroset materials.

SUMMARY OF THE INVENTION

In accordance with the present invention, the density anisotropy of an electroset composition can be controlled by controlling the atmospheric conditions to which the electroset composition is exposed prior to electrosetting. It has been found that exposure of some electroset compositions or the constituents thereof to a room temperature environment of 20% humidity or more can result in the end-product material having a relatively uniform density distribution throughout. These materials, when electrically induced to foam, have a relatively uniform distribution of voids throughout.

However, exposing the same electroset composition to a maintained evacuated atmosphere of 28 inches Hg (mercury) for approximately 90 seconds or longer was found to result in an anisotropic density distribution.

Furthermore, the extent of the anisotropic void distribution was found to be controlled by the amount of and type of electric power applied during the electrosetting process. The term "28 inches Hg⇌" refers to terminology that is standard to the vacuum pump industry, examples of which can be found in Edition No. 61P of the "Equipment & Supplies for Industry, Farm, & Home" catalog distributed by Warehouse Equipment Sales Co. which is located at 437 Eastern Blvd., Essex, Md.

Evacuation of an electroset composition also eliminates the need to expose material handling personnel to the potential hazards resulting from the mixing of a reformulated composition. Furthermore, storage and mixing equipment needs for making a variety of anisotropic density and homogeneous density electroset materials can be minimized.

OBJECT OF THE INVENTION

It is therefore an object of the invention to provide a means of controlling the void distribution of an electrically programmable material.

It is another object of the invention to provide a cost effective means of controlling the void distribution that is programmed into an electrically programmable material.

It is further an object of the invention to provide a time-saving pretreatment means to control the anisotropic character of a density programmed end-product electroset material.

It is still another object of the invention to minimize the exposure of personnel to the potential hazards associated with the handling of some materials.

It is yet further an object of this invention to reduce the storage requirements associated with the warehousing of various different compositions used in the making of electroset materials.

It is yet another object of the invention to reduce the wear on and lifecycle costs of mixing equipment used in the mixing of electroset compositions.

These and other objects and advantages of the invention will be made more evident in the following descriptions of preferred embodiments.

DESCRIPTION OF PREFERRED EMBODIMENTS

The process of pretreating an electroset material for the purpose of programming into a material an anisotropic density distribution comprises the placing the electroset material in an evacuated environment just prior to electrosetting said material.

EXAMPLE 1

A first batch of an electroset fluid composition comprising RP 6402, manufactured by the Ciba-Geigy Corp. located in East Lansing, Mich. was prepared by mixing 350 grams of RP 6402 hardener, 1000 grams of RP 6402 resin and 10 grams of carbon black powder. RP 6402 is a commercially available two part polyurethane sold under the REN brand name. This formulation is obtainable from the Ciba-Geigy Corp. by special order. After pouring the constituents of the mix into a 5000 ml plastic beaker, the mixture was mixed in room atmospheric conditions by hand using a paint stirrer available from the Hechinger's Lumber Store in Annapolis, Md. After mixing thoroughly, was poured into an electroset mold after the interior of the mold had been sprayed with the same mold releasing agent as described in the application entitled "PROGRAMMABLE ELECTROSET MATERIALS AND PROCESSES". The mold, comprising ⅜ inch thick wooden spacers and 2.5 inch by 2 inch flat steel plates, was made of similar construction and dimensions to those described in the application entitled, "PROGRAMMABLE ELECTROSET MATERIALS AND PROCESSES".

The two electrode plates were electrically connected to the output of a High Voltage DC Power Supply, model number PS/PH003000050 which is manufactured by Glassman High Voltage, Inc. Whitestation, NJ.

The material was then electroset at a maximum applied voltage of 3 kilovolts and a maximum applied current of 5 milliamps. After applying the power to the material for a period of 10 minutes, it was observed that the material had completed electrosetting. Then the power supply was turned off, and the electroset material and mold were permitted to stand for 24 hours.

Afterward, a second batch comprising the same electroset composition as the first was mixed in a similar manner to the first batch. The mixture was then placed in a bell jar which was then atmospherically attached by means of a suitably sized rubber hose to the suction intake of a vacuum pump. The bell jar is available as item number N-06520-05 in the Cole-Parmer 1989–1990 catalog distributed by Cole-Parmer Instrument Company of Chicago, Ill. The vacuum pump is sold as item number 3Z657 of catalog edition 61P which is distributed by Warehouse Equipment Sales located in Essex, Md.

After placing the mixture in the bell jar, the vacuum pump was turned on and the interior of the bell jar was evacuated to a vacuum of 29.0 inches of vacuum. After 3 minutes had elapsed, the vacuum pump was turned off and the mixture was removed from the bell jar. The mixture was then poured into a 2.5 inch by 2 inch surface area mold of similar construction and dimensions as the first mold and which had also been sprayed with the same mold release agent in a similar manner to that of the first mold. During the electroset process, a maximum voltage of 3 kilovolts and maximum current of 5 milliamps was applied to the mold in similar manner that of the first mold for about 10 minutes. Afterward, it was observed that the material had electroset and the Glassman High Voltage Power Supply was turned off. The second electroset sample was then permitted to stand for a period of 24 hours.

After this, the electroset materials were removed from their respective molds. Each of the two samples were cut in half and examination of their interior cross-sections revealed that gas pockets or voids had formed within each sample. The voids were distributed homogeneously throughout the first sample. In the second sample, however, the voids were grouped in a layer. It was observed that the plane of the layer of voids was parallel to the plane of the mold electrodes. It was further observed that this layer was distributed entirely in the one half of the sample that was closest to the negative electrode during the electroset process. It was further observed that no voids could be seen in that half of the sample that was closest to the positive electrode during the electroset process.

The procedure disclosed in example 1 of this disclosure was repeated several times and the same results were obtained each time.

It will be readily appreciated in light of this disclosure that articles of diverse geometries can be obtained by using, or alternatively, not using the process of exposing an electroset material to an evacuated environment prior to electrosetting. It is further appreciated that many diverse variations of this process are obtainable without departing from the scope of this invention. Other embodiments of this invention will be apparent to those skilled in the art from a consideration of this specification or practice of the invention disclosed herein. Various omissions, modifications and changes to the principle described may be made by one skilled in the art without departing from the true scope and spirit of the invention which is indicated by the following claims.

We claim as our invention:

1. A process for controlling the density distribution of an electroset composition, said process comprising:
   providing a quantity of electrosetting composition said composition comprising a phase changing vehicle which is both a dielectric and a polymer and an aggregate comprising particles which will polarize in an electric field;
   exposing said electrosetting composition to an evacuated atmospheric pressure of at least 28 inches Hg thereby determining the distribution of voids that can be formed within said electrosetting composition wherein said forming of said voids is responsive to an electric field;
   positioning a first portion of said electrosetting composition between at least two electrically conductive surfaces;
   electrically charging said conductive surfaces such that said first portion solidifies electrically in the manner of an electrorheological fluid while the portion of composition which was not placed between said conductive surfaces remains fluid;
   maintaining said charging such that the cure of said first portion of said electrosetting composition is accelerated and such that voids form within said first portion of said electrosetting composition during said charging, the forming of said voids being responsive to said charging; and,
   separating said solid portion from said fluid portion.

2. A process for controlling the density distribution of an electroset composition, said process comprising:
   providing a quantity of electrosetting composition said composition comprising a phase changing vehicle which is both a dielectric and a polymer and an aggregate comprising particles which will polarize in an electric field;
   exposing said electrosetting composition to an evacuated atmospheric pressure of at least 28 inches Hg for a period of time of at least 90 seconds;
   positioning a first portion of said electrosetting composition between at least two electrically conductive surfaces;
   electrically charging said conductive surfaces such that said first portion of said composition solidifies electrically in the manner of an electrorheological fluid and wherein that portion which was not placed between said conductive surfaces remains fluid;
   separating said solid portion of said composition from said fluid portion of said composition; and,
   maintaining said charging such that the cure of said solid portion of said electrosetting composition is accelerated and such that voids form within said solid portion, the forming of said voids being responsive to said maintaining said charging.

3. A process as claimed in claim 1 wherein the distribution of the voids within said first portion is anisotropic.

4. A process as claimed in claim 2 wherein the distribution of the voids within said solid portion is anistropic.

5. A process as claimed in claim 1 wherein the phase changing vehicle of said composition comprises polyurethane.

6. A process as claimed in claim 2 wherein said phase changing vehicle is polyurethane.

7. A process for controlling the density distribution of an electroset composition, said process comprising:
   providing a quantity of electrosetting composition said composition comprising a phase changing vehicle which is both a dielectric and a polymer and an aggregate comprising particles which will polarize in an electric field;
   exposing said electrosetting composition to an evacuated atmospheric pressure of at least 28 inches Hg;
   positioning a first portion of said electrosetting composition between at least two electrically conductive surfaces;
   electrically charging said conductive surfaces such that said first portion of said composition solidifies electrically in the manner of an electrorheological fluid and wherein that portion which was not placed between said conductive surfaces remains fluid;

separating said solid portion of said composition from said fluid portion of said composition; and,
maintaining said charging such that the cure of said solid portion of said electrosetting composition is accelerated and such that gas pockets form within said solid portion, the forming of said gas pockets being responsive to said maintaining said charging.

8. A process as claimed in claim 7 wherein the distribution of the gas pockets within said first portion is anisotropic.

9. A process as claimed in claim 7 wherein the phase changing vehicle of said composition comprises polyurethane.

* * * * *